Figure 1:
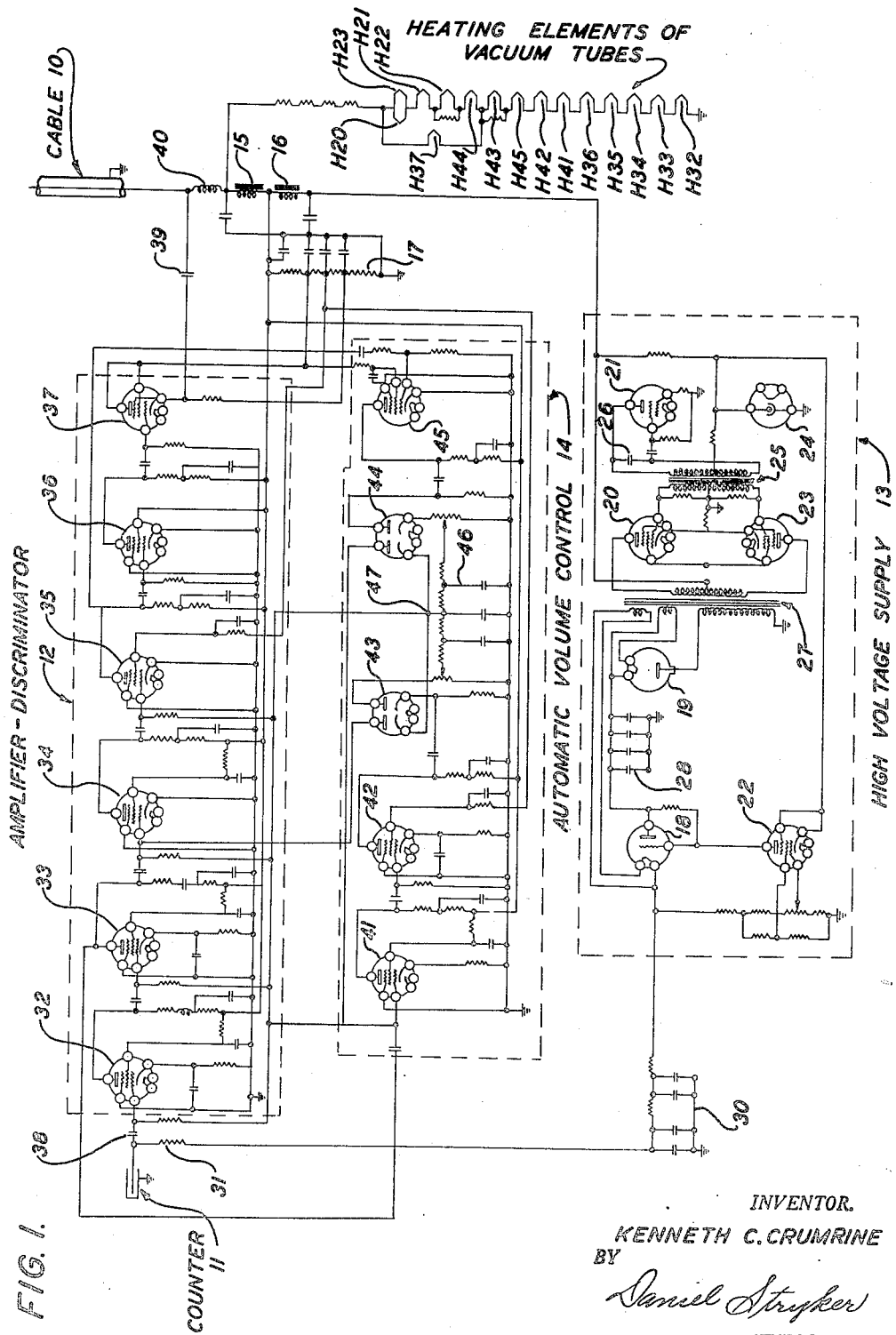

Feb. 13, 1951  K. C. CRUMRINE  2,541,341
WELL LOGGING
Filed July 7, 1947  3 Sheets-Sheet 3

INVENTOR.
KENNETH C. CRUMRINE
BY
Daniel Stryker
ATTORNEY

Patented Feb. 13, 1951

2,541,341

UNITED STATES PATENT OFFICE 2,541,341

WELL LOGGING

Kenneth C. Crumrine, Tulsa, Okla., assignor to The Texas Company, New York, N. Y., a corporation of Delaware Application July 7, 1947, Serial No. 759,368

5 Claims. (Cl. 250—83.6)

1

This invention is concerned with well logging and provides improved apparatus and technique for this purpose.

In wells drilled for either petroleum exploration or production, it is important to identify the position and character of the strata encountered, and also to locate the level at which various installations are made, for example, the position of concrete introduced for purposes of water shut off. Strata penetrated by the well may be identified by core samples taken during the drilling operation, but coring is an expensive procedure which slows down drilling operations, and coring, of course, gives no information with respect to the location of plugs, etc. located outside the well bore proper after drilling. In consequence, various logging methods have been employed to obtain more cheaply the information to be gained by coring or to obtain additional information not thus obtainable. All of the methods involve traversing the bore with an exploring tool and measuring a characteristic which varies from one formation to another. One method makes use of variations in electrical resistivity to identify formations penetrated; another employs variations in self potential; and another measures changes in gamma radiations naturally emitted by the formations. Each method is superior in certain aspects. Thus a shale formation may give a pronounced response in one method and be substantially undetected by a second method which is superior to the first in distinguishing between two different sandstones. Consequently, several methods may be employed in the same well, the sum of the information collected being greater than its parts. However, in some cases, the aggregate information is still inadequate, especially when efforts are made to correlate logs from different wells, as for example when it is desired to determine whether a formation occurring in one well is also encountered in another and if so, how thick it is.

We have discovered that useful information can be obtained by traversing a bore with a source of fast neutrons accompanied by a detector of slow neutrons and determining variations in the intensity of the slow neutrons detected along the bore. An exploring tool containing a source of fast neutrons and a detector of slow neutrons is lowered into a well. The fast moving neutrons experience nuclear collisions in the region surrounding the source (i. e. in the exploring tool itself, in the fluid, if any, in the bore, in the casing, if any, and in the neighboring rock formation) and are thereby scattered and slowed down. Some of the resulting slow neutrons are thus scattered back to the detector, which measures their intensity, the log being a record of this intensity as a function of well depth. Changes in the intensity, which may be as much as 10% or 20% of the total intensity, serve to identify the formations traversed and may be employed alone or in conjunction with other logging methods to gain information with respect to well conditions.

The slow neutron intensity at the detector is a complicated function of the interaction properties of neutrons and the nuclei of atoms with which they collide in the neighborhood of the exploring tool. These interaction properties vary widely among the elements. Nevertheless, the above described method, which is sometimes referred to hereinafter as "fast neutron-slow neutron" logging, does yield useful information in the form of reproducible differences in slow neutron intensity between different kinds of formations; and by logging wells in which information is available regarding the formations penetrated and other well conditions, it has been possible to accumulate empirical data that serve to identify the unknown conditions in other wells similarly logged.

Fast neutron-slow neutron logs have been obtained in accordance with the method of invention in a number of bore holes where the conditions are approximately known from core samples and logs obtained by other methods, and on the basis of the information obtained, it can be concluded that fast neutron-slow neutron logs:

A. are correlatable from one bore to another and so may be used to identify corresponding conditions in each;

B. are correlatable with certain gamma ray logs but are sufficiently different from others to justify running both types in some cases, especially when it is desirable to distinguish between lime and anhydrite formations;

C. are less readily matched with electrical logs and give different information;

D. show greater changes in neutron intensity within formations containing lime than in other formations;

E. are adversely affected by iron employed to case the bore, to the extent that two strings of casing in some cases affords too much shielding of the detector; and F. are affected by well fluids to the extent that in some holes it is desirable, in order to obtain optimum results, to employ an exploring tool of smaller cross section and in others to enlarge the cross section of the tool by placing a sleeve, preferably one of aluminum, on it; thereby displacing well fluid in the neighborhood of the tool.

In the practice of the invention, any suitable source of fast neutrons may be employed. Most practical sources, however, also emit gamma rays, and a proportional radiation counter (which must be especially sensitized for the detection of slow neutrons) is also sensitive to gamma rays or to anything else capable of producing electrons within the active volume of the counter. Thus gamma rays tend to obscure the slow neutron effect. In one of the aspects of the invention, the detector is so constructed that the amplitude of at least some of the pulses attributable to the slow neutrons is greater than the maximum amplitude of the pulses due to gamma rays, and the effect of the gamma rays is minimized by suppressing in the output of the counter pulses of the amplitude of those attributable to gamma rays, leaving a response due solely to slow neutrons.

In essence, the apparatus of the invention comprises an exploring tool containing a source of fast neutrons and a detector of slow neutrons (say a proportional counter), means for traversing the bore hole with the tool and for energizing the detector, and means for measuring the response of the latter. In its preferred form, the apparatus includes a source of fast neutrons which emits a low intensity of gamma rays. However, sources which emit fast neutrons and intense gamma ray beams can also be used together with a radiation detector disposed adjacent the source and sensitive to both slow neutrons and gamma rays, but so constructed that pulses due to at least some slow neutrons have an amplitude greater than any pulses in the detector due to gamma rays, means for suppressing in the output of the detector the pulses having an amplitude up to and including the maximum amplitude of pulses due to gamma rays, and means for measuring the output of pulses not so suppressed.

A preferred neutron source is a metal capsule containing about 200 milligrams of radium and several grams of beryllium. The radium emits alpha and gamma rays. The gamma rays (photons) escape from the capsule. The alpha particles have small penetrating power and do not escape. However, some of them are captured by beryllium nuclei with emission of neutrons having a kinetic energy of several million electron volts, which leave the source at high velocity and penetrate the capsule walls, the well bore and the surrounding casing and rock formations. In so doing, these fast neutrons experience collisions with the nuclei of atoms of the surrounding materials and lose energy. Some are scattered back to the counter.

The neutron counter is constructed to capture and detect the slow neutrons which encounter it, i. e. those scattered back into its active volume. Preferably it comprises a plurality of proportional counters arranged around the fast neutron source. Each counter comprises a tubular cathode through which a thin anode wire passes.

Anode and cathode are disposed in a suitable gaseous atmosphere, say methane, retained in an envelope. The anode is maintained at a positive potential with respect to the cathode. A high resistance is placed in the circuit, and the potential difference between the two electrodes is maintained below that at which a discharge takes place. If a particle capable of ionizing the gas enters the active volume of the counter, it will "trigger," with resultant flow of a small current. This causes a voltage drop across the resistance which is amplified and recorded.

Since slow neutrons produce no direct ionization, the counter must be sensitized, as by incorporating in it an element which will capture slow neutrons with emission of alpha particles, which in turn cause ionization within the counter. Preferably the counter is sensitized by coating the inside of its cathode with a boron compound, although it may also be sensitized by operating it in the presence of a gaseous boron compound. The active isotope of boron, as well as those of other elements such as lithium, have the property of capturing a slow neutron with the emission of alpha particles and an energy of several million electron volts. The alpha particle produced has considerably less penetrating power than an electron having the same energy, because of the greater charge and mass of the alpha particle. Moreover the energy of some alpha particles is expended in the coating prior to entry into the active volume.

The counter employed in the preferred practice of the invention is so designed that only a fraction of the energy entering in the form of gamma rays is expended within the active volume, while a much higher proportion of the energy of alpha rays is so expended. This may be accomplished by employing tubes of certain dimensions and by properly selecting the pressure and kind of gas employed within the active volume. As a result, some of the alpha particles produced from the slow neutrons (i. e. those which have not dissipated too much of their energy in escaping into the active volume from the coating) give bigger pulses than the biggest pulses produced from the gamma rays.

The amplifier employed in the preferred form of apparatus to receive the pulses from the counter operates as a discriminator and is so arranged that it passes only pulses having a predetermined amplitude, this amplitude being selected so that the small pulses due to gamma rays are suppressed.

Bearing the foregoing principles in mind, the operation of the preferred device for fast neutron-slow neutron logging is as follows:

An exploring head containing the slow neutron counter and the fast neutron source is lowered down a bore hole on a logging cable which supplies direct current power to the equipment in the head and also transmits pulses from the counter back to surface equipment. Also included in the head is a vacuum tube amplifier-discriminator of the type mentioned above. It receives pulses from the counter due to the action of gamma rays and slow neutrons therein, and separates from the totality of the pulses received some of those which are due to slow neutrons alone. These it impresses on the logging cable.

In order to avoid difficulties inherently attendant upon impressing a high D. C. voltage on the logging cable, it is preferable to include in the exploring head a vacuum tube circuit, called a high voltage supply, which steps up the voltage received from the cable and supplies the necessary high voltage current to the detector or counter.

Lastly, the exploring head preferably contains an automatic volume control adapted to make the pulse rate independent of changes in power supply, etc.

Pulses sent to the surface through the cable are amplified and measured in conventional equipment and preferably are recorded as a function of well depth, thus giving a log.

To summarize the action of the preferred apparatus of the invention, fast neutrons given off by the neutron source penetrate the formations surrounding the logging head with the result that some are scattered back as slow neutrons to the counter. The slow neutrons strike a sensitive element, say boron, in the counter which gives off alpha particles of high energy but small penetration. Some of these escape with practically undiminished energy into the active volume between the anode and cathode of the counter. At the same time electrons due to gamma rays enter the active volume of the counter, and both the alpha particles and the electrons produce pulses in the output of the counter. The construction and adjustment of the counter is such, however, that some alpha rays expend more of their energy in the counter than do gamma rays so that the pulses due to the alpha rays, that have not lost excessive energy in entering the active volume, are of greater amplitude than any due to gamma rays. The amplifier suppresses all pulses having an amplitude as great as or less than the greatest pulse due to gamma rays, and transmits the remaining pulses, which are due solely to alpha rays produced from slow neutrons, to the amplifying and measuring equipment at the surface.

Figure 2:
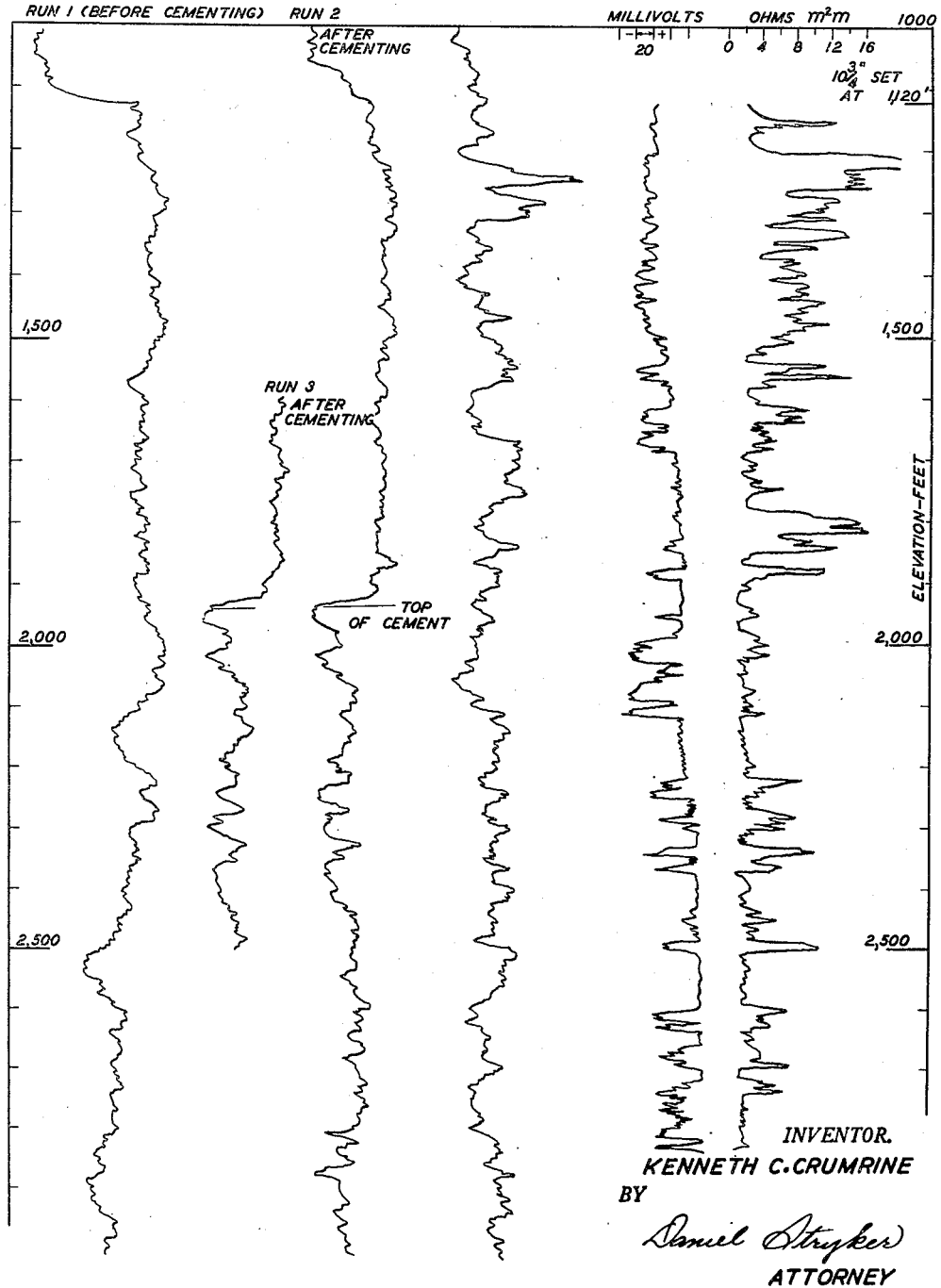
Figure 3:
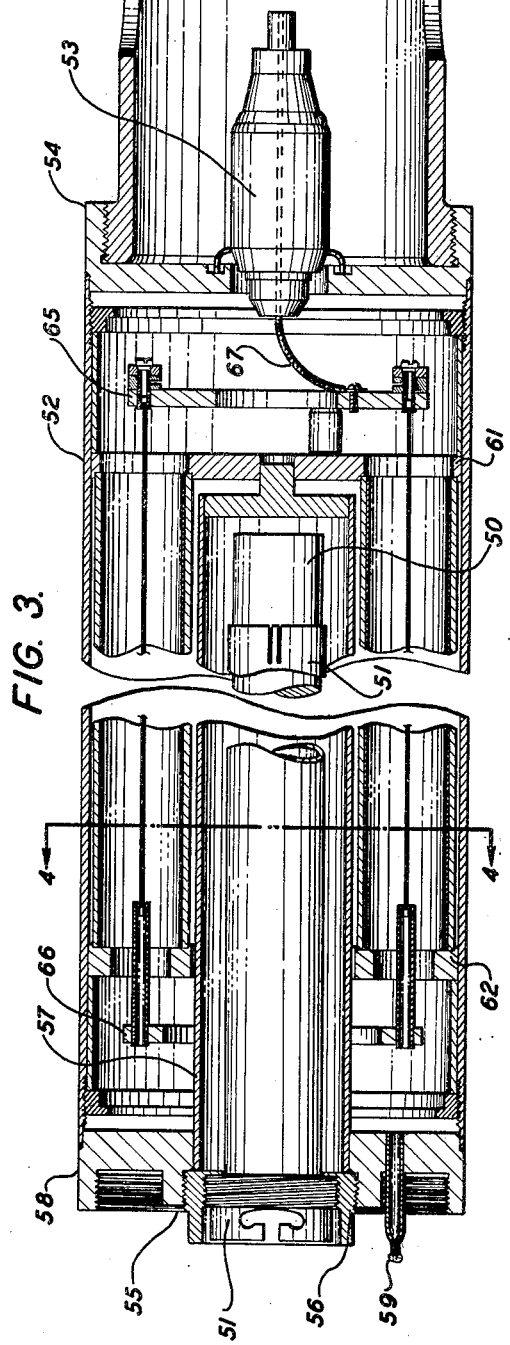
Figure 5:
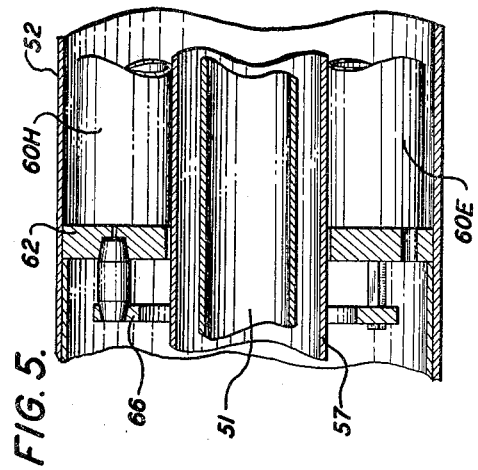
Figure 4:
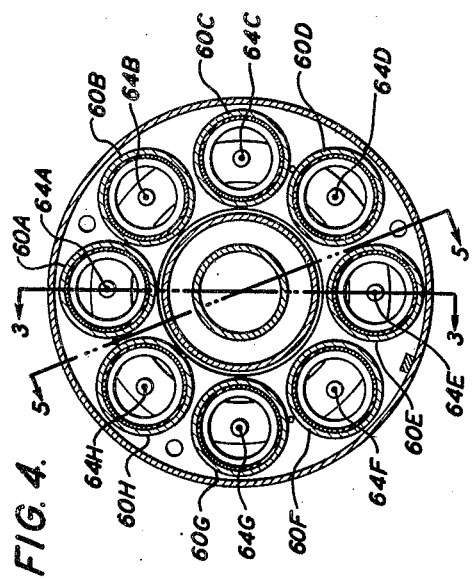

These and other aspects of the invention will be more thoroughly understood in the light of the following detailed description taken in conjunction with the accompanying drawings in which:

Fig. 1 is a wiring diagram of a preferred form of the logging apparatus;

Fig. 2 gives a comparison of logs taken in the same well by the fast neutron-slow neutron technique of the invention, by a conventional gamma ray method, by the self potential electrical method, and by the resistivity method;

Fig. 3 is a section taken along the line 3—3 of Fig. 4 through a portion of a detector head of the invention, including a source of fast neutrons and a multiple proportional counter sensitized for the detection of slow neutrons;

Fig. 4 is a cross section taken through the apparatus of Fig. 3 along the line 4—4; and Fig. 5 is a fragmentary longitudinal section through the apparatus of Figs. 3 and 4, taken along the line 5—5 of Fig. 4.

The apparatus in general

Referring to Fig. 1, the apparatus in essence comprises a logging cable 10, a counter 11 for detecting slow neutrons along with gamma rays, a signal transmitter or amplifier-discriminator channel 12 adapted to suppress pulses other than those due to some slow neutrons, a counter voltage supply 13 and an automatic volume control 14.

The logging cable 10 supplies direct current to the circuit of Fig. 1 from equipment (not shown) at the surface of the ground and also transmits current pulses from the circuit of Fig. 1 to amplifying and recording equipment (not shown), also disposed on the surface. Thus pulses originating in the neutron counter 11 are transmitted to the logging cable through the amplifier-discriminator 12, which separates from the totality of the pulses received some of those which are due to slow neutrons alone. The high voltage supply receives direct current from the cable and supplies high voltage direct current to the neutron counter. The automatic volume control supplies bias voltages to various tubes of the circuit and thereby tends to make the pulse rate which is delivered to the cable invariant with respect to changes in power supply, current, temperature and other factors.

Power and signal transmission

In Fig. 1, the shield of the cable 10 is considered to be at ground or zero potential, and the conductor of the cable is maintained at about 250 volts above ground by a primary power source (not shown). A direct current of about .6 ampere flows from the conductor of the cable through various paths in the unit of Fig. 1 to ground. One such path includes the heating elements of certain vacuum tubes of the apparatus as shown on the extreme right of the drawing, the various elements being designated by the same numerals as those employed for the respective tubes hereinafter, but with the prefix "H." Another path includes two inductances 15, 16 and that portion of the circuit which is the high voltage supply 13 of the counter. A third path contains a high resistance 17 (say 22,500 ohms) from which various plate, screen and cathode voltage supplies for vacuum tubes are tapped off as shown.

As indicated above, the cable receives current pulses at varying rates from the counter via the discriminator 12 and transmits them to the surface equipment which amplifies, equalizes, integrates and records them in a conventional manner as a function of depth of the well being logged.

The counter voltage supply 13 comprises a vacuum tube circuit containing tubes 18, 19, 20, 21, 22, 23, 24 connected as shown. The counter voltage supply receives current at relatively low voltage from the logging cable and modifies it to produce a stable and filtered potential of about 1,000 volts positive with respect to ground, this voltage supply being impressed across the counter.

Tubes 20, 21, 22, 23 are heater type tubes provided with heating elements energized as indicated hereinbefore by that portion of the circuit shown at the extreme right of Fig. 1. In the preferred structure, the tubes of the counter voltage supply are of the following types:

| Tube | Type |
|---|---|
| Tube 18 | 1H4G |
| Tube 19 | 8016 |
| Tube 20 | 35A5 |
| Tube 21 | 6J5 |
| Tube 22 | 7C7 |
| Tube 23 | 35A5 |
| Tube 24 | VR105 |

To consider the circuit in further detail, the primary winding of a transformer 25 in series with a condenser 26 forms an oscillator circuit, oscillation thereof at a frequency of about 500 cycles per second being maintained by the tube 21. This signal frequency is applied to the tubes 20, 23, which are identical, as indicated above, and operate in a push-pull power amplifier circuit. A transformer 27 transmits power from this amplifier circuit to the filaments of the tubes 18 and 19 and impresses a potential of about 2,000 volts peak on the plate of the tube 19, which acts as a rectifier. A capacitance 28 to ground between the tubes 18 and 19 partially smooths the rectified wave form. Part of the rectified current at high voltage passes through the tube 18 which in effect constitutes a variable resistance controlled by the tubes 22, 24. Thus tubes 18, 22, 24 together with their associated circuit elements form a voltage stabilizer and filter which maintains the potential at the filament of the tube 18 essentially constant at about 1,000 volts above ground or at such other value as may be selected. The wave form is further smoothed by a resistance-capacitance filter 30 through which the high voltage supply is connected to the anode of the counter 11 via an additional resistance 31. The cathode of the counter is connected to ground as shown.

Amplifier and discriminator

Attention is directed to the main amplifier and discriminator channel 12 which contains vacuum tubes 32, 33, 34, 35, 36, 37. Negative voltage pulses from the anode of the counter are impressed upon the discriminator through the grid of the tube 32 (which preferably is of type 1852) through a blocking condenser 38. The tubes 33, 35 and 36 are likewise of this type, while tube 34 is of type 1853 and tube 37 is of type 50L6.

After amplification by the first two stages, the pulses appear at the grid of the tube 34 with the original pulse size distribution. The tube 34 has a remote cut-off characteristic and a compressing effect upon the pulse size distribution. At the grid of the next tube 35, which is biased beyond cut-off, a selection from the pulse sizes is effected, all pulses smaller than a certain size being suppressed by this stage so that there is transmitted to the grid of the next tube 36 only the larger sizes. Proper adjustment of the discriminator assures that those pulses which are transmitted are practically all caused by slow neutrons with practically none due to gamma rays. The tubes 35 and 36 amplify and equalize the transmitted pulses of larger amplitude, and these appear as positive pulses at the grid of the tube 37. This is a power tube operated beyond cut-off. By cathode feed, positive pulses are impressed through a capacitance coupling 39 on to an inductance 40 and thence by means of the cable 10 to the surface equipment.

Automatic volume control

That portion of the circuit of Fig. 1 constituting the automatic volume control 14 comprises vacuum tubes 41, 42, 43, 44, 45 with the associated circuit elements shown. Tubes 41, 42 and 45 are of type 1852 and tubes 43 and 44 are of type 6H6.

The output of the tube 33 in the discriminator-amplifier 12 contains unequalized pulses due to neutrons and gamma rays. These are impressed upon the grid of the tube 41 in the automatic volume control. After amplification by two stages represented by the tubes 41 and 42, the pulses are more or less equalized and are impressed upon the cathode of the tube 43, which acts as a rectifier. The output pulses from the rectifier tube 43 are integrated by a resistance-capacitance network 46 and a negative voltage for use as automatic volume control bias is made available at point 47 in the circuit. A relatively small proportion of this bias voltage is due to neutron pulses because, in the output of the counter, for reasons expressed hereafter, the gamma ray pulses ordinarily outnumber the neutron pulses at least ten to one and probably more. A correction is made, however, to offset this contribution due to neutron pulses by impressing the output of the tube 35 of the amplifier-discriminator on the grid of the tube 45 in the AVC circuit. The output of the tube 35 in the amplifier-discriminator is representative only of neutron pulses. After rectification by the rectifier tube 44 and integration by the resistance-capacitance network, these neutron pulses supply a positive voltage to the point 47 of the network. Such positive voltage can be adjusted in magnitude to offset the previously described negative contribution from the neutron pulses. The net AVC voltage at the point 47 is therefore almost entirely due to gamma ray pulses, and in consequence it is invariant with respect to changes in the neutron pulse rate from the counter which are due to changes in environment, say to changes in rock formation encountered. In short, an automatic control voltage is developed at the point 47 which cannot affect the sensitivity of the equipment to the neutron density changes at the counter for the measurement of which the equipment is designed. The net AVC voltage does not depend upon the measured quantity.

By way of explanation, let it be considered that the grids of the tubes in the main amplifier-discriminator channel 12 are connected to a fixed negative potential of say 5 volts instead of to the AVC bias point 47 as shown in Fig. 1. Then let the counter voltage be increased. The amplitude of all pulses yielded by the counter increases, and their number increases because the pulse size must still be graded downward to zero. There will then be a greater number of larger pulse amplitudes at the grid of the tube 35 for overriding the cut-off bias of this tube, and consequently the pulse rate delivered through this tube to the cable will be increased. It will be plain that a counter and amplifier so constructed have no plateau as a function of counter voltage. However, this same increase in counter voltage has caused delivery of a greater number of pulses to the AVC channel, and the bias voltage at point 47 has therefore become more negative. So if, instead of the fixed bias of 5 volts applied to the tubes of the amplifier-discriminator, there be applied the AVC bias voltage from the point 47 (as is actually the case in Fig. 1) the gain of the tubes 32, 33, and 34 will be decreased and tube 35 will become biased still further beyond cut-off. A plateau may thus be achieved by the amplifier, counter and automatic volume control in combination.

To take another case, if the cathode emission in the several tubes be increased as a result of an increase in heater current or as a result of an increase in temperature in the bore hole, the gain of the tubes 32, 33, 34 with fixed bias of say 5 volts will be increased, and more pulses can override the cut-off bias of the tube 35 to increase the pulse rate at the cable. But the same factors which cause an increase in the cathode emission likewise increase the gain of the stages in the automatic volume control 14 so that the bias voltage at the point 47 will become more negative. If this bias be employed instead of fixed bias in the amplifier-discriminator channel, the gain of the tubes 32, 33, 34 will be more constant and the pulse rate delivered to the cable will be invariant with respect to changes in cathode emission.

Back wave elimination

As indicated above, the tube 43 in the AVC channel 14 is of the duodiode type. Half of this tube is connected to effectively eliminate positive pulses on the grid of the tube 34 in the amplifier-discriminator channel, because on the latter grid only negative pulses have significance. Similar use is made of half of the duodiode tube 44 of the AVC channel, which is connected to the grid of the tube 41.

*Decoupling filters*

The capacitance 39 (of say .5 microfarad) is employed as described hereinbefore to pass pulses from the cathode of the tube 37 to the cable and to prevent the D. C. power supply voltage from affecting this cathode. The air core coil 40 offers a high impedance to the pulses but a very low impedance to the D. C. supply current from the cable. The chokes 15 and 16 have iron cores and present relatively low impedance to the flow of the primary supply current and effectively prevent the 500 cycle per second alternating current, produced by the oscillator, from affecting the B+ supply or the heaters of the vacuum tubes or the logging cable. As indicated in the drawing, liberal use of resistance-capacitance de-coupling filters is employed in the plate circuits of many of the stages.

*The counter*

The counter 11 shown diagrammatically in Fig. 1 is shown in detail in Figs. 3, 4 and 5. The apparatus employs a neutron source in the form of about 200 miligrams of radium and several grams of beryllium, inclosed in a sealed metal cylinder 50. This capsule is held by a friction grip in a source holder 51 disposed on the central axis of the counter. This counter is an elongated cylinder 52 having an insulator 53 mounted concentrically on one end plate 54 and with a source hole 55 and a gas exhaust tube 59 in the other end plate 58.

The source holder is threaded into a reducer 56, the outer threads of which fit the inside threads of the source hole. Thus the source capsule is disposed in a center tube 57 and is centrally located with respect to the counter as a whole. The exhaust tube is fastened to and passes through the end plate 58. This exhaust tube is crimped off after the equipment is assembled and filled with an appropriate atmosphere, and finally sealed with soft solder.

Eight cathode tubes 60A, 60B, 60D, 60E, 60F, 60G, 60H, 60J are spaced symmetrically in the annulus within the cylinder around the center tube. Each is about 24 inches long and has an inside diameter of about 0.65 inch and an outside diameter of 0.75 inch. These tubes are metallic, and each is coated with boron carbide powder held in a binder of nitro-cellulose cement. The boron carbide powder employed should be of small particle size, i. e. the maximum dimension of the grains should not exceed about 3 thousandths of an inch, and the thickness of the coat in actual practice varies from zero to about 3 to 5 thousandths of an inch.

The cathode tubes are at ground potential and are held in position by supporting plates 61, 62, the ends of the cathodes projecting into the plates. Each cathode is provided with an anode wire 64A, 64B, 64C, 64D, 64F, 64G, 64H, 64J passing coaxially through its cathode and insulated therefrom. The anode wires are held at their ends by frames 65, 66, and are connected electrically in parallel to the lead wire 67 which passes out through the insulated bushing 53 in the end plate 54.

The space within which the anodes and the cathodes are disposed in the counter is closed, save for the exhaust tube connection. In assembly, a vacuum pump is coupled to this exhaust tube, and the apparatus is pumped out while it is heated to approximately 100° C. It is then flushed several times with dried natural gas and finally after cooling to room temperature is filled with natural gas at a pressure of about two inches of mercury. The natural gas contains about 99% methane and may be considered substantially pure methane. After the space in which the anodes and cathodes are contained is thus filled, the exhaust tube is crimped off and sealed with soft solder.

If desired, the cylinder containing the counter and the fast neutron source may be shock proofed by enclosing it in a fabric sleeve and rubber tubing combination (not shown) fitting around the counter and further enclosed within a steel pressure-proof housing, within which the entire exploring tool illustrated in Fig. 1 is enclosed.

*Operation of the counter*

The counter has an active volume between anode wires and cathode tubes which is roughly co-extensive with the wires. The active volume between any one of the cathode tubes and its axially located anode wire is energized by a radial electric field of force.

In essence, the counter is a condenser having a certain capacitance C. An electromotive force $V_0$ (constant but subject to manual control) and a resistance R are connected in series with the condenser, i. e. across the counter. If a pair of ions (a negative primary electron and a residual positively charged molecule) appear in the active gas-filled volume, both ions will be accelerated by the electrical field, and both will be decelerated on the average by collisions with molecules of the gas. The motion of the two ions is largely determined by field intensity and the gas pressure. The field is not uniform, so the electron will travel toward the wire with increasing acceleration, and the positive ion will travel toward the cathode tube with decreasing acceleration. In the immediate vicinity of the small wire, the field is relatively very strong, and the electron can acquire relatively great speed (or great energy) between two successive collisions. If this primary electron acquires sufficient energy, it can ionize by collision. The primary electron and the secondary electron which is formed can again ionize by collisions, producing tertiary electrons and so on. Thus the primary electron may produce an avalanche of electrons the size of which increases with increases in $V_0$, and which may number several hundred. This avalanche arrives speedily at the anode, and coincidently formed positive ions travel more slowly to the cathode.

The charge motion thus generated within the active volume constitutes an electric current which flows through the resistance R and causes a drop in potential at the anode. Subsequently, assuming that there is an interval during which no ions appear in the active volume, the charge will cease to move therein, and the potential of the anode will increase to its normal value. The time required for this recovery will be determined largely by the value of the product RC.

The variation of potential at the anode constitutes a negative voltage pulse, the magnitude of which depends upon the number of electrons constituting the avalanche arriving at the anode.

The avalanche considered above was produced by one single primary electron. There is a range of values for $V_0$ at which the size of an avalanche depends upon the number of primary electrons appearing nearly simultaneously in the active volume. Consequently, for such values of $V_0$, the size of the voltage pulse at the anode depends upon the number of primary electrons causing it. Thus the pulse amplitude is proportional to the number of primary electrons and in consequence the apparatus is called a proportional counter.

Detection of slow neutrons

The counter described herein, due to the presence of the active isotope of boron on the cathode, is sensitive to slow neutrons, but is also sensitive to gamma rays or anything else capable of providing primary electrons within the active volume. For the present purposes, however, it is only necessary to consider the primary electrons formed as the result of action within the counter by the slow neutrons and the gamma rays. This is because the number of primary electrons produced within the active volume by the action of fast neutrons is negligible.

A gamma ray (photon) can project an electron from the solid or gaseous matter within the counter, and this electron can produce by collision along its path in the active volume a number of primary electrons. The original electron supplied by the gamma ray in the counter may receive from the ray an energy of a million electron volts or more, but the design of the counter is such that this energy cannot be expended in producing primary electrons, the dimensions of the cathode tubes and pressure and kind of gas being such that only a fraction of the energy is so expended, a large proportion of the balance being expended in harmless ionization processes within metal at the beginning and end of its path. Even so, the counter yields a large number of so-called gamma ray pulses.

A slow neutron produces no direct ionization within the active volume, but slow neutrons introduced into the counter are captured by the active isotope of boron with resultant emission of an alpha particle and an energy of several million electron volts. The alpha particle has considerably less penetrating power than an electron having the same energy, principally because of the larger relative charge and mass of the alpha particle. The counter is so dimensioned that the alpha particle may expend all of its energy within the active volume. Thus, an alpha particle may produce a proportionally larger number of primary electrons than in the case of a gamma ray. This brings about an increase of the avalanche at the anode. At first glance, then, the pulses due to the slow neutrons should be bigger than the pulses due to the gamma rays. However, some of the alpha particles lose a large fraction of their energy before emerging from the boron carbide coating and so have less energy with which to produce primary electrons within the active volume. The result is that some of the pulses due to slow neutrons have amplitudes no greater than those due to gamma rays and, like those due to gamma ray pulses, are graded in amplitude continuously downward to zero.

The net result of the foregoing action within the proportional counter of the invention is to produce from some of the slow neutrons pulses having an amplitude greater than the amplitude of any pulses due to gamma rays and to produce from other slow neutrons pulses having amplitudes no greater than those of pulses obtained from gamma rays. Suppression of the pulses resulting from gamma rays, therefore, is necessarily accompanied by the suppression of some pulses due to slow neutrons.

The distribution of neutron pulse sizes also means that the boron carbide counter is not such that its pulse rate is independent of counter voltage. Nevertheless an amplifier of suitable type (for example that of the amplifier-discriminator and AVC channel of Fig. 1) can largely overcome this disadvantage so that over a range exceeding 100 volts the combination of boron carbide counter and amplifier may have a remarkably flat plateau, as discussed hereinbefore.

A slow neutron detector sensitized with boron carbide is superior primarily because of its long life (due in part to the chemical inertness of boron carbide), its relative ease of construction and its relatively high efficiency at low counter voltages. Thus a boron carbide counter has about 10 times the efficiency of one sensitized with boron fluoride gas, assuming that both are designed suitably for well logging use and to operate at comparable voltages.

Combined action of source, environment, and counter

If a neutron counter of the type described is lowered into a bore hole, the action is as follows:

Fast neutrons and gamma rays emitted from the source stream outwardly through the counter and penetrate through the exploration tool housing, pass through any well fluid or casing present and into the adjacent rock formation. The counter detects many gamma rays but only a negligible amount of fast neutrons.

The fast neutrons are slowed down by nuclear collisions in the material surrounding the place of emission and eventually are captured by the nuclei. Some of the fast neutrons following collision and slowing down are scattered back to the counter as detectable slow neutrons.

Other than empirically, the back scattering from a given rock formation is difficult to determine because elements vary greatly in the effect which they have in scattering and capturing fast and slow neutrons. For the elements sulphur, aluminum and tin, the mean free path of slow neutrons appears to be greater than that for fast neutrons, the mean free path being the average distance which a particle travels between collisions. For lithium, boron and cadmium, the mean free path of slow neutrons is extremely small compared with that for fast neutrons. Hydrogen is perhaps more effective than any other element in slowing down fast neutrons, but it is also a good absorber for slow neutrons. Moreover the average lifetime of a neutron varies greatly. Net effect of a given formation is, therefore, difficult to calculate in advance of actual test. Nevertheless, the back scattering of slow neutrons from various rock formations differs sufficiently to permit its measurement to be a useful index in logging.

The counter source and discriminator described yield more than a thousand neutron pulses per second at the recording end of 11,000 feet of cable employed in logging operations. The variations in counting rate, so far observed in unconsolidated sediments of a laboratory test hole, are much less than this, say a few hundred per second; i. e. from one formation to the next, the counting rate may vary by only 10 or 20%, and useful information may be represented by even smaller differences in counting rate. However, the equipment is such that the total counting rate is measured with a sufficient high order of accuracy to reliably disclose significant minor differences.

This is illustrated by Fig. 2 whereon fast neutron-slow neutron logs made in accordance with the invention are disposed side by side with a conventional gamma ray log, a conventional self-potential electrical log and a conventional electrical resistivity log made in the same hole. The fast neutron-slow neutron logs made in accordance with the invention are easily distinguishable from the other logs and give different details.

The left hand fast neutron-slow neutron log was made before cementing the well at approximately 1950 feet. The next two logs represent two runs made with the apparatus of the invention following cementing. There is a remarkable correspondence between the two runs, showing that the apparatus gives reproducible results and moreover there is a marked decrease in neutron intensity exactly at the top of the cement.

Both of the electrical logs which are reproduced at the extreme right hand of Fig. 2 were run before the casing was cemented. The gamma ray log was run after the casing was cemented. Consequently, the other logs are not strictly comparable to the fast neutron-slow neutron logs and are reproduced only to show the difference in character of the several types.

I claim:

1. In a logging device, the combination which comprises a logging head containing a source of fast neutrons and gamma rays, a proportional counter sensitive to slow neutrons and gamma rays and capable of producing pulses of greater amplitude from slow neutrons than from gamma rays, an amplifier-discriminator circuit adapted to suppress pulses of the gamma ray amplitude and to leave unsuppressed pulses of neutron amplitude, a counter voltage supply, and an automatic volume control for controlling the amplitude-discriminator circuit, said automatic volume control being responsive to the gamma rays being detected by the proportional counter, but substantially unresponsive to the slow neutrons detected by the counter.

2. In a logging device the combination which comprises a logging head containing a source of fast neutrons and gamma rays, a proportional counter sensitive to slow neutrons and gamma rays and capable of producing pulses of greater amplitude from slow neutrons than from the gamma rays, means for suppressing pulses of the amplitude of those produced from the gamma rays, an automatic volume control for controlling the suppressing means, said automatic volume control being responsive to the gamma rays detected by the proportional counter but unresponsive to the slow neutrons detected by the counter, and means for measuring the unsuppressed pulses.

3. Apparatus according to claim 2 in which the automatic volume control is disposed in the logging head.

4. In a logging device the combination which comprises a logging head containing a source of fast neutrons and gamma rays and a proportional counter sensitive to slow neutrons and gamma rays and capable of producing pulses of greater amplitude from slow neutrons than from gamma rays, an amplitude-discriminator circuit adapted to suppress pulses of the gamma rays and to leave unsuppressed pulses of neutron amplitude, said amplifier-discriminator circuit comprising a multi-stage amplifier including a first and second amplifying tube, a third tube having a remote cut-off characteristic, a fourth tube, means biasing the fourth tube beyond cut-off at a level such that all pulses smaller than a certain size are suppressed, a fifth tube connected to receive the unsuppressed pulses from the fourth tube, and a power tube operated beyond cut-off, the amplified pulses being fed from the fifth tube to the grid of the power tube, and an automatic volume control for controlling the amplifier-discriminator circuit, said automatic volume control being responsive to the gamma rays detected by the proportional counter but substantially unresponsive to the slow neutrons detected by the counter.

5. In a logging device the combination which comprises a logging head containing a source of fast neutrons and gamma rays, a proportional counter sensitive to slow neutrons and gamma rays and capable of producing pulses of greater amplitude from slow neutrons than gamma rays, an amplifier-discriminator circuit adapted to suppress pulses of the gamma ray amplitude and to leave unsuppressed pulses of neutron amplitude, and an automatic volume control comprising a first amplification stage, means for feeding unequalized pulses from the amplifier-discriminator circuit to the first amplification stage, a first rectifier tube for receiving the amplified pulses for the first amplification stage, an integrating circuit comprising a resistance capacitance network for integrating the pulses from the first rectifier tube, a second amplification stage, means for feeding the unsuppressed pulses from the amplifier-discriminator circuit to the second amplification stage, a second rectifier tube connected to receive pulses from the second amplification stage and means for feeding the net voltage from the second rectifier to the amplifier-discriminator circuit.

KENNETH C. CRUMRINE.

REFERENCES CITED

The following references are of record in the file of this patent:

UNITED STATES PATENTS

| Number | Name | Date |
| --- | --- | --- |
| 2,220,509 | Brons | Nov. 5, 1940 |
| 2,288,718 | Kallmann et al. | July 7, 1942 |
| 2,316,329 | Hare | Apr. 13, 1943 |
| 2,321,295 | Howell | June 8, 1943 |
| 2,334,262 | Hare | Nov. 16, 1943 |
| 2,345,119 | Hare | Mar. 28, 1944 |
| 2,390,433 | Fearon | Dec. 4, 1945 |
| 2,440,167 | Broxon et al. | Apr. 20, 1948 |
| 2,443,731 | Herzog et al. | June 22, 1948 |
| 2,462,471 | Crumrine | Feb. 22, 1949 |
| 2,483,139 | Herzog | Sept. 27, 1949 |

OTHER REFERENCES

Korff, Electron and Nuclear Counters, April 1946, D. Van Nostrand, pages 196, 197.